W. E. TAYLOR.
METALLIC JOINT.
APPLICATION FILED NOV. 23, 1918.
1,355,712.
Patented Oct. 12, 1920.
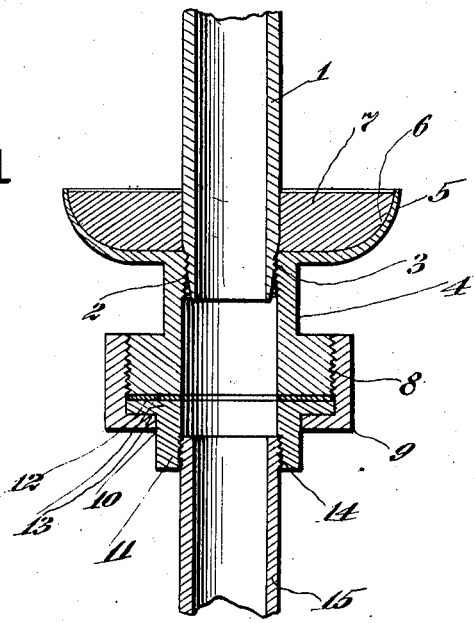
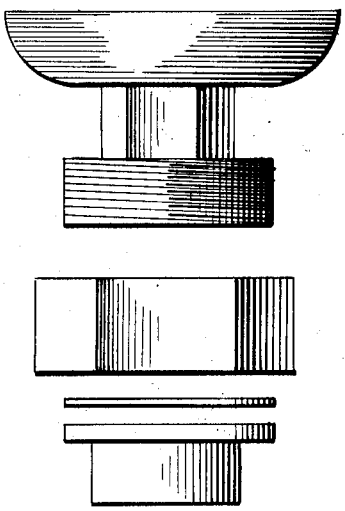
Inventor
Walter Elmer Taylor
Witnesses
By Victor J. Evans
Attorney

UNITED STATES PATENT OFFICE.

WALTER ELMER TAYLOR, OF AVALON, PENNSYLVANIA.

METALLIC JOINT.

1,355,712.　　　Specification of Letters Patent.　　Patented Oct. 12, 1920.

Application filed November 23, 1918. Serial No. 263,929.

*To all whom it may concern:*

Be it known that I, WALTER ELMER TAYLOR, a citizen of the United States, residing at Avalon, in the county of Allegheny and State of Pennsylvania, have invented new and useful Improvements in Metallic Joints, of which the following is a specification.

This invention relates to a joint and has for its primary object to provide a joint whereby pipe sections may be connected together in a liquid tight manner.

An object of the invention is to provide a joint that may readily connect a lead pipe to an iron pipe without the necessity of flanging the lead pipe which is the usual practice.

Another object of the invention is to provide a joint capable of diminishing the time required for connecting a lead pipe to an iron pipe.

Another object of the invention is to provide means for facilitating the connection of the joint with the pipe.

With these and other objects in view the invention will be better understood from the following detailed description taken in connection with the accompanying drawing wherein:

Figure 1 is a vertical sectional view of my invention.

Fig. 2 is a side elevation of the parts separated.

In the drawing which illustrates one form of my invention the numeral 1 designates a lead pipe having one end tapering as illustrated at 2 so as to be gripped by certain of the interiorly arranged threads 3 of the joint 4. The joint 4 includes the curved flange 5 encircling the pipe section 1 to form a depression 6 for the reception of solder 7 or other sealing material. Thus it will be seen that in a very simple manner solder may be poured into the recess 6 and allowed to solidify without the necessity of attention. It will also be noted that the flange 5 is arranged in a manner that the solder will gravitate into contact with the surface of the pipe section 1 so as to accomplish a liquid tight joint; thus materially reducing the time necessary to provide a connection between the lead pipe 1 and pipe of dissimilar material that will now be described.

The joint 4 is further provided with exteriorly arranged threads 8 for engagement with interiorly arranged threads upon a collar 9 forming one element of a union 10 the other element 11 of which is brought into tight engagement with a washer 12 or direct engagement with the surface of the union 4 by the coöperation of the flanges 13. The element 11 is provided with interiorly arranged threads 14 for engagement with an ordinary iron pipe 15. From the foregoing description it will be seen that the joint may be readily connected to a line of piping without the necessity of rotating the end section of the piping and further without disturbing the connection between the joint and the lead pipe.

Having described my invention, what I claim is:

In means for connecting a lead pipe to an iron pipe, a lead pipe, an upper member secured on the lower end of said pipe and provided at its upper end with an upwardly directed saucer shaped element surrounding the pipe and adapted to receive a sealing material in molten condition, sealing material supported by said saucer shaped member and in intimate contact with the pipe, an iron pipe, a lower member secured on the upper end of said iron pipe and provided at its upper end with an outer annular shoulder, the lower end portion of said upper member being exteriorly threaded, and a collar engaging beneath said shoulder and threaded onto the lower end of the upper member for securing said upper and lower members together.

In testimony whereof I affix my signature.

WALTER ELMER TAYLOR.